(12) United States Patent
Slattery

(10) Patent No.: US 11,704,925 B2
(45) Date of Patent: *Jul. 18, 2023

(54) SYSTEMS AND METHODS FOR DIGITIZED DOCUMENT IMAGE DATA SPILLAGE RECOVERY

(71) Applicant: Capital One Services, LLC, McLean, VA (US)

(72) Inventor: Douglas Slattery, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/179,123

(22) Filed: Feb. 18, 2021

(65) Prior Publication Data

US 2021/0174119 A1 Jun. 10, 2021

Related U.S. Application Data

(63) Continuation of application No. 16/521,163, filed on Jul. 24, 2019, now Pat. No. 10,963,725, which is a
(Continued)

(51) Int. Cl.
*G06V 30/414* (2022.01)
*G06T 5/30* (2006.01)
(Continued)

(52) U.S. Cl.
CPC ............ *G06V 30/414* (2022.01); *G06T 3/608* (2013.01); *G06T 5/005* (2013.01); *G06T 5/30* (2013.01);
(Continued)

(58) Field of Classification Search
CPC .... G06V 30/153; G06V 30/414; G06V 30/10; G06V 10/243; G06V 10/34; G06T 3/608; G06T 5/005; G06T 5/30; G06T 7/13
(Continued)

(56) References Cited

U.S. PATENT DOCUMENTS 5,050,222 A 9/1991 Lee
5,083,210 A 1/1992 Reilly et al.
(Continued)

FOREIGN PATENT DOCUMENTS

| JP | 2007036799 | * | 2/2007 | ............. H04N 5/232 |
| JP | 2009-224903 | * | 10/2009 | ............. H04N 5/335 |
| JP | 6699897 | * | 5/2020 | ........... H04N 5/2253 |

*Primary Examiner* — Jerome Grant, II
(74) *Attorney, Agent, or Firm* — Hunton Andrews Kurth LLP

(57) ABSTRACT

Systems and methods for digitized document image data spillage recovery are provided. One or more memories may be coupled to one or more processors, the one or more memories including instructions operable to be executed by the one or more processors. The one or more processors may be configured to capture an image; process the image through at least a first pass to generate a first contour; remove a preprinted bounding region of the first contour to retain text; generate one or more pixel blobs by applying one or more filters to smudge the text; identify the one or more pixel blobs that straddle one or more boundaries of the first contour; resize the first contour to enclose spillage of the one or more pixel blobs; overlay the text from the image within the resized contour; and apply pixel masking to the resized contour.

20 Claims, 7 Drawing Sheets

Related U.S. Application Data continuation of application No. 16/151,900, filed on Oct. 4, 2018, now Pat. No. 10,402,673.

(51) Int. Cl.

| | | |
|---|---|---|
| *G06T 3/60* | (2006.01) | |
| *G06T 5/00* | (2006.01) | |
| *G06T 7/13* | (2017.01) | |
| *G06V 30/148* | (2022.01) | |
| *G06V 10/24* | (2022.01) | |
| *G06V 10/34* | (2022.01) | |

(52) U.S. Cl.
CPC .............. *G06T 7/13* (2017.01); *G06V 10/243* (2022.01); *G06V 10/34* (2022.01); *G06V 30/153* (2022.01)

(58) Field of Classification Search
USPC ........................................................ 382/176
See application file for complete search history.

(56) References Cited

U.S. PATENT DOCUMENTS

| | | |
|---|---|---|
| 5,197,107 A | 3/1993 | Katsuyama et al. |
| 5,321,770 A | 6/1994 | Huttenlocher et al. |
| 5,557,689 A | 9/1996 | Huttenlocher et al. |
| 5,583,949 A | 12/1996 | Smith et al. |
| 5,625,710 A | 4/1997 | Katsuyama et al. |
| 5,687,253 A | 11/1997 | Huttenlocher et al. |
| 6,249,604 B1 | 6/2001 | Huttenlocher et al. |
| 6,690,821 B2 | 2/2004 | Goldberg et al. |
| 7,310,773 B2 | 12/2007 | Lin |
| 7,561,742 B2 | 7/2009 | Boose et al. |
| 8,009,928 B1 | 8/2011 | Manmatha et al. |
| 8,290,302 B2 | 10/2012 | Nafarieh |
| 8,606,011 B1 | 12/2013 | Ivanchenko et al. |
| 8,768,057 B2 | 7/2014 | Saund |
| 8,965,117 B1 | 2/2015 | Rybakov et al. |
| 8,965,127 B2 | 2/2015 | Wu et al. |
| 9,104,940 B2 | 8/2015 | Wu |
| 9,412,052 B1 | 8/2016 | Natarajan et al. |
| 9,619,872 B1 | 4/2017 | Medina, III et al. |
| 10,002,301 B1 | 6/2018 | Mahmoud et al. |
| 10,176,400 B1 | 1/2019 | Rivard |
| 2006/0029296 A1 | 2/2006 | King et al. |
| 2007/0041643 A1 | 2/2007 | Akagi et al. |
| 2008/0292215 A1 | 11/2008 | Gaucas et al. |
| 2009/0016605 A1 | 1/2009 | Chao |
| 2011/0007970 A1 | 1/2011 | Saund |
| 2012/0224765 A1 | 9/2012 | Kim et al. |
| 2016/0057331 A1 | 2/2016 | Yoo et al. |
| 2016/0203625 A1 | 7/2016 | Khan et al. |
| 2017/0249526 A1 | 8/2017 | Kawasaki |
| 2017/0372460 A1 | 12/2017 | Zagaynov et al. |

\* cited by examiner 410  400

| TRANSFEREE'S NAME (TYPED) | 402 | | | | 406 |
| 408 BOBBY D JONES JR OR | 401 404 | | | | |
| JESSICA SARAH JONES | 403 | | | | |
| STREET ADDRESS | | CITY | ST. | ZIP CODE | |

TRANSFEREE'S NAME (TYPED)  415
BOBBY D JONES JR OR
JESSICA SARAH JONES
STREET ADDRESS                CITY        ST.        ZIP CODE

Figure 4B

TRANSFEREE'S NAME (TYPED) 430
435 BOBBY D JONES JR OR 440
JESSICA SARAH JONES
STREET ADDRESS                    CITY        ST.      ZIP CODE
251 N BLUFF WICHITA KS 67230

Figure 4E

CITY        ST.      ZIP CODE
                                        445
Figure 4F

400

TRANSFEREE'S NAME (TYPED)
BOBBY D JONES JR OR
JESSICA SARAH JONES
STREET ADDRESS
450

TRANSFEREE'S NAME (TYPED)
BOBBY D JONES JR OR
455

Figure 4H

SYSTEMS AND METHODS FOR DIGITIZED DOCUMENT IMAGE DATA SPILLAGE RECOVERY

CROSS REFERENCE TO RELATED APPLICATION

The subject application is a Continuation of Ser. No. 16/521,163 filed Jul. 24, 2019, which is a Continuation of Ser. No. 16/151,900 filed Oct. 4, 2018, now U.S. Pat. No. 10,402,673, the contents of which are hereby incorporated by reference in their entirety.

FIELD OF THE DISCLOSURE

The present disclosure relates to systems and methods for digitized document image data spillage recovery.

BACKGROUND OF THE DISCLOSURE

Current solutions for optical character recognition processing of recovering data outside bounding boxes exhibit inaccuracy and are incomplete, thereby resulting in reduced quality of character recognition, increased processing time, and increased costs associated therewith. These and other drawbacks exist.

Accordingly, there is a need to accurately recover data spillage in a manner that efficiently uses system and other resources.

SUMMARY OF THE DISCLOSURE

In an exemplary embodiment, a data spillage recovery system may include one or more processors. The system may include one or more memories coupled to the one or more processors. The one or more memories may include instructions operable to be executed by the one or more processors. The one or more processors may be configured to capture an image. The one or more processors may be configured to process the image through at least a first pass to generate a first contour. The one or more processors may be configured to generate one or more pixel blobs by applying one or more filters to smudge the text. The one or more processors may be configured to identify the one or more pixel blobs that straddle one or more boundaries of the first contour. The one or more processors may be configured to resize the first contour to enclose spillage of the one or more pixel blobs. The one or more processors may be configured to overlay the text from the image within the resized contour. The one or more processors may be configured to apply pixel masking to the resized contour.

In an example embodiment, a method may include receiving, by one or more processors, a digitized document image. The method may include processing, by the one or more processors, the image through at least a first pass generate a first contour. The method may include preserving, by the one or more processors, text by removing a preprinted bounding box of the first contour. The method may include applying, by the one or more processors, one or more filters to smudge the text so as to generate one or more pixel blobs. The method may include evaluating, by the one or more processors, the one or more pixel blobs that straddle one or more boundaries of the contour. The method may include resizing, by the one or more processors, the first contour so as to enclose spillage of the one or more pixel blobs. The method may include overlaying, by the one or more processors, the text from the image within the resized contour. The method may include creating, by the one or more processors, a mask to remove data resulting from resizing the first contour. The method may include applying, by the one or more processors, the mask to the resized contour.

In an example embodiment, a data spillage recovery application may be configured to process a received image through at least a first pass to generate a first contour. The application may be configured to eliminate a preprinted bounding region of the first contour to preserve text. The application may be configured to produce one or more pixel blobs by applying one or more filters to smudge the text. The application may be configured to analyze the one or more pixel blobs that overlap one or more boundaries of the first contour. The application may be configured to adjust the first contour to enclose spillage of the one or more pixel blobs. The application may be configured to overlay the text from the image within the adjusted contour. The application may be configured to apply pixel masking to the adjusted contour.

BRIEF DESCRIPTION OF THE DRAWINGS

FIGS. 4A-4H depict diagrams illustrating digitized document image data spillage recovery according to an example embodiment.

DETAILED DESCRIPTION

According to the various embodiments of the present disclosure, systems and methods are provided for digitized document image data spillage recovery. In some examples, documents printed on preprinted forms spill outside of the bounding boxes identifying where the data should be. Contours around the preprinted bounding boxes may truncate data spillage outside of the preprinted boxes, resulting in data loss during optical character recognition (OCR) processing. As described herein, systems and methods ensure that data spillage outside of preprinted boxes and identifying contours is included in the contour by resizing it to only include spillage and not data that could be included by resizing the contour. In some examples, data spillage recovers how much data spills over into adjacent boxes.

Exemplary embodiments of digitized document image data spillage recovery include and are not limited to one or more sections, portions or regions, such as an earnings section or deduction section of a paystub, or different preprinted boxes on IRS tax forms. Other examples may comprise government forms, business forms, or any document, form, image, paper, or other publication used for any purpose.

Figure 1:
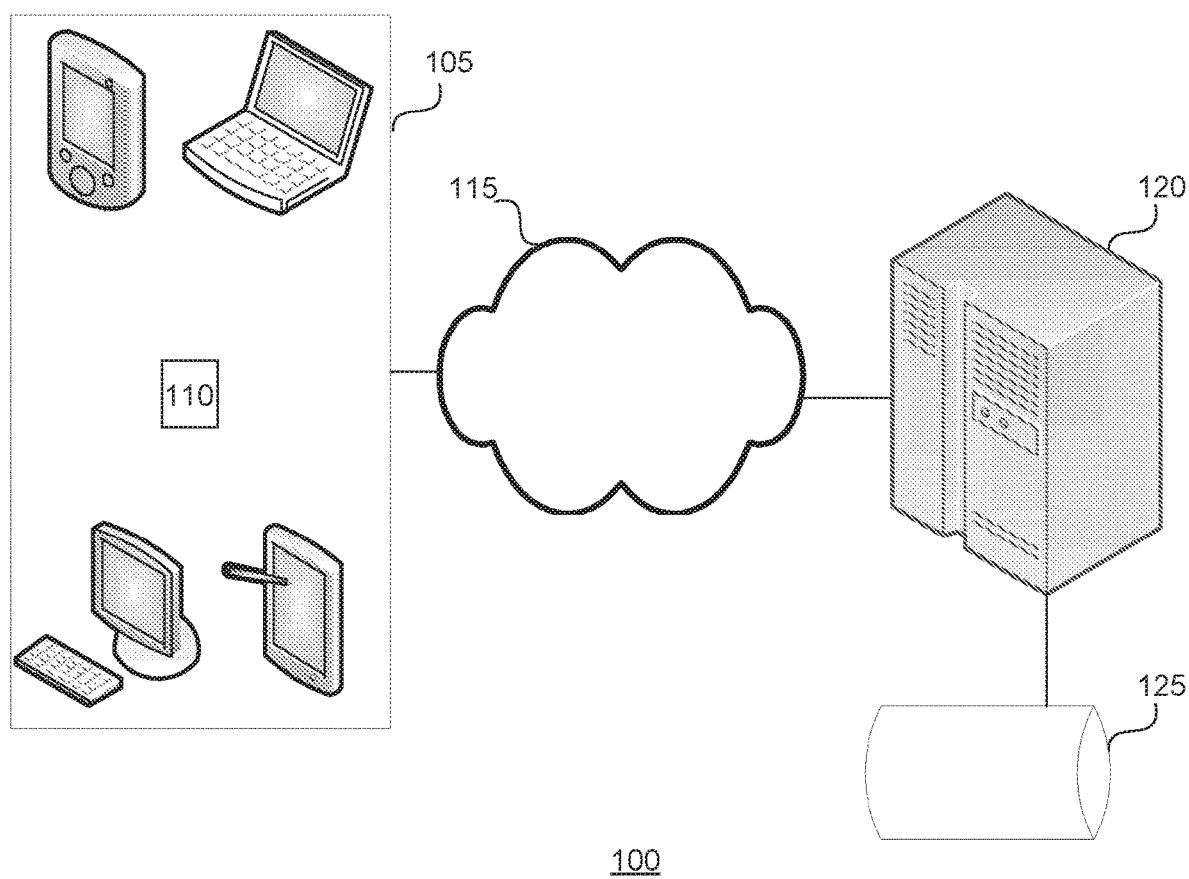
FIG. 1 depicts a block diagram of a system configured to provide digitized document image data spillage recovery according to an example embodiment.

FIG. 1 illustrates a system 100 configured to provide digitized document image data spillage recovery according to an example of the present disclosure. As further discussed below, system 100 may include client device 105, network 115, server 120, and database 125. Although FIG. 1 illustrates single instances of the components, system 100 may include any number of components, including one or more processors.

As shown in FIG. 1, client device 105, or end node 105, may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. Client device 105 also may be a mobile device; for example, a mobile device may be a smart phone, a laptop computer, a tablet computer, a wearable device, and/or any other like mobile device or portable computing device.

In various examples according to the present disclosure, client device 105 of system 100 may execute one or more applications 110, such as software applications, that enable, for example, network communications with one or more components of system 100 and transmit and/or receive data. In some examples, an application 110 may be installed on client device 105, such as a mobile device. Application 110 may include instructions to perform digitized document image data spillage recovery as described herein. In some examples, application 110 may include instructions to determine whether or not to perform a portion of digitized document image data spillage recovery on client device 105 and/or transmit, via one or more networks 115, the digitized document image to another system, such as a remote database, server, or third party system. Client device 105 may be in communication with one or more servers 120 via one or more networks 115, and may operate as a respective front-end to back-end pair with server 120. Client device 105 may transmit, for example from a mobile device application 110 executing on client device 105, one or more requests to server 120. The one or more requests may be associated with retrieving data from server 120. Server 120 may receive the one or more requests from client device 105. Based on the one or more requests from client device 105, server 120 may be configured to retrieve the requested data from one or more databases 125. Based on receipt of the requested data from one or more databases 125, server 120 may be configured to transmit the received data to client device 105, the received data being responsive to one or more requests.

Data associated with the digitized document image may be received, captured, or otherwise obtained through a variety of processes. In some examples, a digitized document image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the digitized document image may be received from local storage. In some examples, digitized document image may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud.

Server 120 may include one or more processors, which are coupled to memory. Server 120 may be configured as a central system, server or platform to control and call various data at different times to execute a plurality of workflow actions. Server 120 may be configured to connect to database 125. Server 120 may be connected to at least one client device 105.

Network 115 may be one or more of a wireless network, a wired network or any combination of wireless network and wired network, and may be configured to connect client device 105 to server 120. For example, network 115 may include one or more of a fiber optics network, a passive optical network, a cable network, an Internet network, a satellite network, a wireless LAN, a Global System for Mobile Communication (GSM), a Personal Communication Service (PCS), a Personal Area Network (PAN), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth network, or any other wired or wireless network for transmitting and receiving a data signal.

In addition, network 115 may include, without limitation, telephone lines, fiber optics, IEEE Ethernet 802.3, a wireless network, a wide area network (WAN), a wireless personal area network (WPAN), a local area network (LAN), a body area network (BAN), a global network such as the Internet, a cellular network, or any combination thereof. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

In various examples, network 115 may be configured to provide data communication between a client device 105 and server 120 and between the client devices 105. For example, data may be communicated between client devices 105 and server 120 through the Internet or other network, and data may be communicated directly between client devices 105 and/or one or more databases 125 without passing through server 120. Accordingly, network 115 may be one or more of the Internet, Near Field Communication (NFC), Radio Frequency Identification (RFID), Bluetooth, Wi-Fi, and/or the like. Client devices 105 may be same or different devices.

System 100 may be configured to process the digitized document image if it is received in a skewed manner. For example, system 100 may be configured to process skew adjustment or morphage of the digitized document image for data spillage recovery. In some examples, skew adjustment or morphage may comprise adjusting or orienting the image such that the image is transformed and aligned to account for skew. For example, the image may be provided at an angle and thus skew correction is utilized to accurately adjust the image. System 100 may be configured to subject the digitized document image for preprocessing for contouring through one or more filters. For example, the image may be preprocessed by an Otsu threshold filter, a despeckle filter, and/or a grayscale filter. In some examples, the Otsu threshold filter may be configured to adjust one or more of brightness and contrast to improve readability of the digitized document image. In some examples, the despeckle filter may be configured to remove speckles, such as noise, from the digitized document image such that one or more pixels are whited out so it no longer remains a part of the image.

In some examples, system 100 may be configured to process skew adjustment or morphage of the image, which may comprise processing edge detection to the digitized document image so as to determine linearity of the content of the document based on vertical and horizontal edges. For example, if the edges are not parallel or perpendicular to the edges of the image boundary, system 100 may be configured to determine how many degrees the content should be rotated so as to sufficiently align the parallel or perpendicular edges to the image boundary edges. In the case where an image is tilted at an angle at the time of capture, a four point affine transformation algorithm may be applied by system 100 to correct it.

System 100 may be configured to preprocess the digitized document image through at least a first pass to generate a first contour. In some examples, the first pass by system 100 may be configured for contouring one or more portions, such as one or more preprinted boxes. The first pass may include canny edge detection to identify one or more shapes in the image. Image contouring may comprise creating one or more geometric point arrays around the canny edge detection shapes. The geometric point arrays may be collected to create one or more bounding boxes. For example, canny edge detection may return one or more coordinate pairs, such as one or more (x,y) coordinate points. By receiving one or more (x,y) coordinate points, a vector may be created so as to generate one or more bounding boxes. In some examples, the one or more portions may comprise of rectangular-shaped preprinted boxes. The one or more portions may comprise oval regions, circular regions, square regions, polynomial regions, and checked box regions. In some examples, if the one or more portions are not rectangular-shaped, system 100 may be configured to convert the one or more portions to rectangular-shaped dimensions so as to continue processing of the digitized document image.

The terms "smudge" or "smudged," as used herein, refer to any blurring, blocking, bolding, fattening, thickening, or combining of text into an interconnected or indistinct form. The term "blob" as used herein refers to an indeterminate shape, including without limitation a smudged image of one or more characters. The term "spillage" as used herein, refers to any character, text, image, or portion thereof that extends beyond a specified area, field, or range. In some examples, "bounding box" may be interchangeably used with "bounding region."

System 100 may be configured to remove a preprinted bounding region of the first contour to retain text. In some examples, one or more filters, such as line removal digital image filters, may be configured to remove a preprinted bounding region so only text is retained. The line removal digital image filters may be configured to remove horizontal and vertical lines. Accordingly, this process eliminates the preprinted bounding region of a clip of the image.

System 100 may use one or more filters, such as dilation and erosion digital image filters, which may be configured to smudge the text (after removal of the lines) into one or more large blobs of pixels. In some examples, the dilation filter may be configured to enlarge objects, and brighten a given region of text within an image by, for example adding pixels, (so white pixels become more white) and the erosion filter may be configured to shrink objects, and make the region of text in white smaller, for example removing pixels, (so remove white pixels where there are already white pixels, such that shapes get thinner, edges may be trimmed). For example, the dilation filter may only be used to smudge the text together into one or more pixel blobs. This also connects pixels of text that straddles lines that were previously removed and pixels composing the straddling text. In some examples, closing may be performed such that dilation filtering precedes erosion filtering. For example, erosion may comprise a post-process data spillage operation that may be configured to remove one or more undesirable artifacts, for example, one or more remaining line segments that "strike out" straddling text.

System 100 may be configured to identify the one or more blobs of pixels that straddle, spill, extend, fall out or otherwise exceed a boundary line of preprinted bounding region of the first contour. In some examples, contouring is performed on the blob of pixels so as to identify complete areas of text. This may be used to help locate text for data spillage that is desired for retaining. The resulting contour around the smudged text may be used to encapsulate the pixels composing the text. In some examples, the one or more straddled pixel blobs are based on one or more coordinates associated with a threshold. For example, text may spill over one or more segments of a bounding box, thereby straddling it. The one or more segments may comprise top, bottom, right, and left line segments of the bounding box. Using the bottom left coordinates and bottom right coordinates of a bottom line of the bounding box the text straddles where the x coordinate may represent horizontal in a positive direction from left to right, and the y coordinate may represent vertical in a positive direction from top to bottom. The y value of the topmost pixels comprising the straddling text is less than (above) the y value of the bottom line the text straddles, and correspondingly, the y value of the bottommost pixels comprising the straddling text is greater than (below) the y value of the bottom line the text straddles. Accordingly, this relationship may qualify the text as a data spillage.

In one example, system 100 may be configured to process a first function for straddling text with reference to a bottom line of the bounding box, where $Y_t$ may represent the y value of the topmost pixels of straddling text, $Y_b$ may represent the y value of the bottommost pixels of straddling text, and $Y_l$ may represent the y value of the bottom line:

$$\text{Straddling text(true/false)} = (Y_t < Y_l \&\& Y_l < Y_b)$$

Similarly, system 100 may be configured to process the first function for top, left, and right line segments comprising the bounding box contour with the line in between the corresponding pixel end points (e.g. top, left and right) of the text. In some examples, a second function, which may be similar to the first function, may be processed by system 100 directed to text that touches one or more line segments but does not straddle it.

System 100 may be configured to resize the first contour to enclose spillage of the one or more blobs of pixels. In some examples, coordinates of the original contour may be compared for determining a sufficient resize. For example, as long one edge, such as a left edge of smudge, is less than a left edge of preprinted bounding region, this may determine whether it is a candidate for data spillage. Straddling may thus be indicated by a top portion of the blob as being above the line, and a bottom portion of the blob as being below the line.

System 100 may be configured to overlay the text from the image within the resized contour. In some examples, a logical AND is applied between to determine which data belongs with the new contour, and which does not. For example, coordinates of smudges, such as a y coordinate of the lowest portion of the text within the preprinted bounding region may be adjusted for a new contour to be created. The resized contour may be based on the outermost pixels of text spillage and a new clip may be produced by copying pixels within the resized contour to a new image that comprises the size of the contour. In effect, the original contour is discarded.

System 100 may be configured to apply pixel masking to the resized contour. In some examples, a pixel mask is created in relation to the original contour with the smudged contours. Accordingly, pixel masking results in removal of one or more white pixels. Application of the pixel mask allows determination of which data belongs with the new contour and which does not. In one example, one or more white pixels may be removed, and all black pixels that match will remain black. For example, one or more white pixels in the pixel mask may represent data that does not belong with the new contour.

System 100 may be configured to process removal of one or more artifacts via ligature processing. In some examples, one or more artifacts may include one or more of lines, marks, holes, spaces or dashes or other like representations appearing in the image. For example, a resulting contour, after applying pixel masking, may illustrate encapsulated data spillage. Artifact, such as line artifact, may be removed by ligature processing. Ligature processing may be used by downstream processing scans to check for one or more word sized contours created based on one or more bounding boxes about the size of printed text height and the approximate width of two or more characters. The word sized contour may be scanned from one direction to another, such as from left to right, identifying one or more pinch points between connected characters, in which case the one or more pinch points may be whited out to produce a separation of characters. Thus, system 100 may be configured to perform one or more conditional checks of the resized contour. In some examples, the one or more conditional checks of the resized contour may be performed via a machine learning model.

Figure 2:
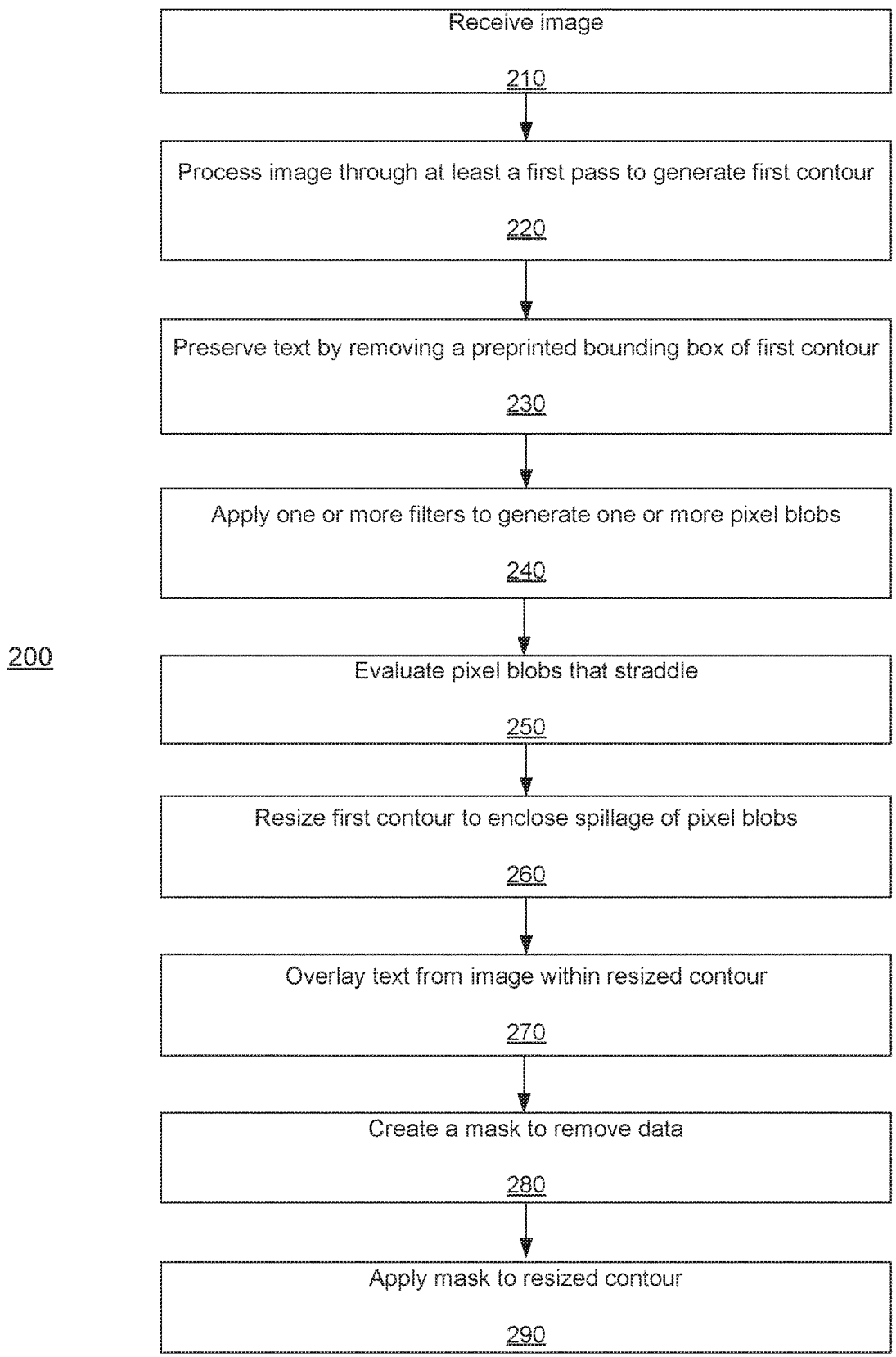
FIG. 2 depicts a flow diagram illustrating a method for digitized document image data spillage recovery according to an example embodiment.

FIG. 2 illustrates a method 200 for providing digitized document image data spillage recovery according to an example of the present disclosure. As explained below, method 200 may reference same or similar components of system 100. For example, as described herein, client device may be similar to client device 105 as described above with respect to FIG. 1. Exemplary embodiments of digitized document image data spillage recovery include and are not limited to one or more sections, portions or regions, such as an earnings section or deduction section of a paystub, or different preprinted boxes on IRS tax forms. Other examples may comprise government forms, business forms, or any document, form, image, paper, or other publication used for any purpose.

At block 205, an image may be received by one or more processors (similar to one or more processors as described above with respect to FIG. 1). In some examples, the image may comprise a digitized document image. In some examples, data associated with the image may be received, captured, or otherwise obtained through a variety of processes. In some examples, the image may be received from one or more computing devices, including but not limited to, scanners, sensors, cameras, mobile devices, and the like and/or any combination thereof. In some examples, the image may comprise a .gif, .bmp, .tiff, .png, .jpeg file format or the like. In some examples, the image may be received from local storage. In some examples, the image may be received from a cloud. For example, cloud computing may comprise an Internet connection between the systems that are operating in the cloud. The cloud may comprise a plurality of systems such that one or more shared resources, such as processing, peripherals, software, data, servers, and the like are provided to any system of the cloud so as to allow access and distribution of services and/or data between the systems of the cloud. In some examples, processing, by the one or more processors, skew adjustment or morphage of the digitized document image for data spillage recovery may be optionally performed. In some examples, skew adjustment or morphage may comprise adjusting or orienting the image such that the image is transformed and aligned to account for skew. For example, the image may be provided at an angle and thus skew correction is utilized to accurately adjust the image. For example, skew adjustment or morphage of the digitized document image may comprise utilizing, by the one or more processors, edge detection to the digitized document image so as to determine linearity of the content of the document based on vertical and horizontal edges. For example, if the edges are not parallel or perpendicular to the edge of the image boundary, one or more processors may be configured to determine how many degrees the content should be rotated so as to sufficiently align the parallel or perpendicular edges to the edges of the image boundary. Where an image is tilted at an angle at the time of capture, one or more processors may be configured to correct it via one or more algorithms, such as a four point affine transformation algorithm.

At block 210, the image may be processed, by the one or more processors, through at least a first to generate a first contour. In some examples, preprocessing of the image may include application of one or more filters. For example, the image may be preprocessed by an Otsu threshold filter, a despeckle filter, and/or a grayscale filter. In some examples, the Otsu threshold filter may be configured to adjust one or more of brightness and contrast to improve readability of the digitized document image. In some examples, the despeckle filter may be configured to remove speckles, such as noise, from the digitized document image such that one or more pixels are whited out so it no longer remains a part of the image. Further details of the first pass is described in FIG. 3. As explained below with reference to FIG. 3, it is understood that preprinted boxes must be identified prior to identifying text that straddles them.

At block 215, text may be preserved, by the one or more processors, by removing a preprinted bounding box of the first contour. For example, lines of the preprinted bounding box may be removed such that only text of the clip is preserved. In some examples, the line removal digital image filters are configured to remove horizontal and vertical lines. Accordingly, this process eliminates the preprinted bounding box.

At block 220, one or more filters may be applied, by the one or more processors, to smudge the text so as to generate one or more pixel blobs. For example, filters, such as dilation and erosion digital image filters, are applied to the clip and configured to smudge the text (after the lines have been removed and only the text remains) into one or more large blobs of pixels. In some examples, the dilation filter may be configured to enlarge objects, and brighten a given region of text within an image by, for example adding pixels, (so white pixels become more white) and the erosion filter may be configured to shrink objects, and make the region of text in white smaller, for example removing pixels, (so remove white pixels where there are already white pixels, such that shapes get thinner, edges may be trimmed). For example, the dilation filter may only be used to smudge the text together into one or more blobs of pixels. This also connects pixels of text that straddles lines that were previously removed and pixels composing the straddling text. In some examples, closing may be performed such that dilation filtering precedes erosion filtering. For example, erosion may comprise a post-process data spillage operation that may be configured to remove one or more undesirable artifacts, for example, one or more remaining line segments that "strike out" straddling text. For example, a black blob may indicate where the text originally was located.

At block 225, the one or more pixel blobs may be evaluated, by the one or more processors, that straddle one or more boundaries of the contour.

At block 230, the first contour may be resized, by the one or more processors, so as to enclose spillage of the one or more pixel blobs. Contouring is performed on the blob of pixels so as to identify complete areas of text. This may be used to help locate text for data spillage that is desired for retaining. The resulting contours around the smudged text may be used to encapsulate the pixels composing the text. In some examples, the one or more straddled pixel blobs are based on one or more coordinates associated with a threshold. For example, text may spill over one or more segments of a bounding box, thereby straddling it. The one or more segments may comprise top, bottom, right, and left line segments of the bounding box. Using the bottom left coordinates and bottom right coordinates of a bottom line of the bounding box the text straddles where the x coordinate may represent horizontal in a positive direction from left to right, and the y coordinate may represent vertical in a positive direction from top to bottom. The y value of the topmost pixels comprising the straddling text is less than (above) the y value of the bottom line the text straddles, and correspondingly, the y value of the bottommost pixels comprising the straddling text is greater than (below) the y value of the bottom line the text straddles. Accordingly, this relationship may qualify the text as a data spillage.

In one example, the one or more processors may be configured to process a first function for straddling text with reference to a bottom line of the bounding box, $Y_t$ may represent the y value of the topmost pixels of straddling text, $Y_b$ may represent the y value of the bottommost pixels of straddling text, and $Y_l$ may represent the y value of the bottom line:

Straddling text(true/false)=$(Y_t < Y_l \&\& Y_l < Y_b)$

Similarly, the one or more processors may be configured to process the first function for top, left, and right line segments comprising the bounding box contour with the line in between the corresponding pixel end points (e.g. top, left and right) of the text. In some examples, a second function, which may be similar to the first function, may be processed by the one or more processors directed to text that touches one or more line segments but does not straddle it.

At block 235, the text from the image may be overlayed, by the one or more processors, within the resized contour. For example, an outline, such as a thin black outline around text may represent one of the resulting contours from text smudging overlayed on the clip. Other contours, represented by think black outlines, may also qualify for data spillage. For example, once the text has been smudged together into blobs of pixels, canny edge detection may result in an outline that represents location of the smudged text.

At block 240, a mask may be created, by the one or more processors, to remove data resulting from resizing the first contour. For example, the mask may comprise a pixel mask which results in removal of one or more white pixels.

At block 245, the mask may be applied, by the one or more processors, to the resized contour. Application of the pixel mask allows determination of which data belongs with the new contour and which does not. In one example, one or more white pixels may be removed, and all black pixels that match will remain black. For example, one or more white pixels in the pixel mask may represent data that does not belong with the new contour.

In some examples, method 200 may comprise artifact removal which may be conducted, by the one or more processors, via ligature processing, including removing line artifacts appearing through the text. In some examples, one or more artifacts may include one or more of lines, marks, holes, spaces or dashes or other like representations appearing in the image. For example, a resulting contour, after applying pixel masking, may illustrate encapsulated data spillage. Artifact, such as line artifact, may be removed by ligature processing. Ligature processing may be used by downstream processing scans to check for one or more word sized contours created based on one or more bounding boxes about the size of printed text height and the approximate width of two or more characters. The word sized contour may be scanned from one direction to another, such as from left to right, identifying one or more pinch points between connected characters, in which case the one or more pinch points may be whited out to produce a separation of characters.

At block 250, thus, one or more conditional checks of resized contour may be performed by the one or more processors. In some examples, the one or more conditional checks of the resized contour may be performed via a machine learning model.

Figure 3:
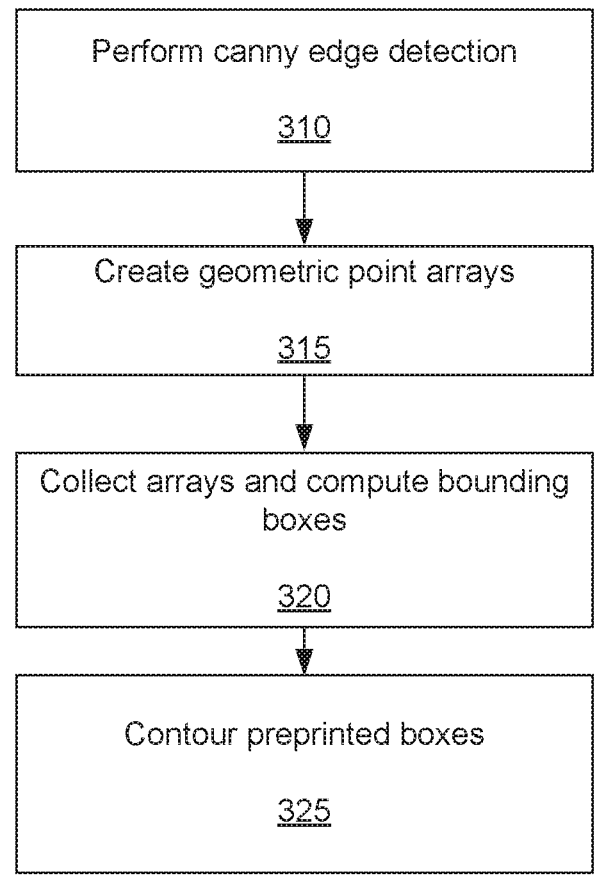
FIG. 3 depicts a flow diagram illustrating a method of a first pass configured for contouring preprinted regions according to an example embodiment.

FIG. 3 illustrates a method 300 of a first pass for contouring preprinted boxes. As explained below, method 300 may reference same or similar components of system 100. For example, as described herein, one or more processors may be similar to the one or more processors as described above with respect to FIG. 1.

In some examples, the first pass by the one or more processors may be configured for contouring one or more portions, such as one or more preprinted boxes. The first pass may include canny edge detection 310 to identify one or more shapes in the image. Image contouring may comprise creating one or more geometric point arrays 315 around the canny edge detection shapes. The geometric point arrays may be collected to create one or more bounding boxes 320. For example, canny edge detection may return one or more coordinate pairs, such as one or more (x,y) coordinate points. By receiving one or more (x,y) coordinate points, a vector may be created so as to generate one or more bounding boxes. In some examples, the one or more portions may comprise of rectangular-shaped preprinted boxes. The one or more portions may comprise oval regions, circular regions, square regions, polynomial regions, and checked box regions. In some examples, if the one or more portions are not rectangular-shaped, the one or more processors may be configured to convert the one or more portions to rectangular-shaped dimensions so as to continue processing of the digitized document image. Thus, the first pass is configured for contouring one or more preprinted boxes 325.

FIGS. 4A-4H depict diagrams illustrating digitized document image data spillage recovery according to an example embodiment. As explained below, FIGS. 4A-4H may reference same or similar components of system 100. For example, as described herein, one or more processors may be similar to the one or more processors as described above with respect to FIG. 1. Exemplary embodiments of digitized document image data spillage recovery include and are not limited to one or more sections, portions or regions, such as an earnings section or deduction section of a paystub, or different preprinted boxes on IRS tax forms. Other examples may comprise government forms, business forms, or any document, form, image, paper, or other publication used for any purpose.

As shown in FIG. 4A, a portion or clip 400 of a received or captured digitized document image illustrates a data spillage problem. As observed in FIG. 4A, "JESSICA SARAH JONES" 405 straddles preprinted bounding box 410 since portions of this text 405 spill, extend, fall out or otherwise exceed a boundary line of preprinted bounding box 410. For example, text 405 may spill over one or more segments of bounding box 410, thereby straddling it. The one or more segments may comprise top 402, bottom 402, right 406, and left 408 line segments of bounding box 410. Using the bottom left coordinates and bottom right coordinates of a bottom line of the bounding box 410 the text 405 straddles where the x coordinate may represent horizontal in a positive direction from left to right, and the y coordinate may represent vertical in a positive direction from top to bottom. The y value of the topmost pixels comprising the straddling text 405 is less than (above) the y value of the bottom line 404 the text straddles 405, and correspondingly, the y value of the bottommost pixels comprising the straddling text 405 is greater than (below) the y value of the bottom line 404 the text straddles 405. Accordingly, this relationship may qualify the text 405 as a data spillage.

In one example, one or more processors may be configured to process a first function for straddling text with reference to a bottom line 404 of the bounding box 410, where $Y_t$ may represent the y value of the topmost pixels 401 of straddling text 405, $Y_b$ may represent the y value of the bottommost pixels 403 of straddling text 405, and $Y_l$ may represent the y value of the bottom line 404.

$$\text{Straddling text(true/false)} = (Y_t < Y_l \,\&\&\, Y_l < Y_b)$$

Similarly, one or more processors may be configured to process the first function for top 402, right 406, and left 408 line segments comprising the bounding box contour with the line in between the corresponding pixel end points (e.g. top 402, right 406, and left 408) of the text. In some examples, a second function, which may be similar to the first function, may be processed by one or more processors directed to text that touches one or more line segments but does not straddle it.

As shown in FIG. 4B, one or more filters, such as line removal digital image filters, are configured to remove the preprinted boxes so only text remains on clip 400. For example, as observed in FIG. 4B in comparison with FIG. 4A, lines from clip 400 have been removed such that only text of clip 400 is retained. In some examples, the line removal digital image filters are configured to remove horizontal and vertical lines. In this example, removal of the lines incurs white space 415 appearing through "JESSICA SARAH JONES," which is accounted and explained in further detail with respect to FIG. 4G. Accordingly, this process eliminates the preprinted bounding box 410 previously shown in FIG. 4A.

Figure 4C:
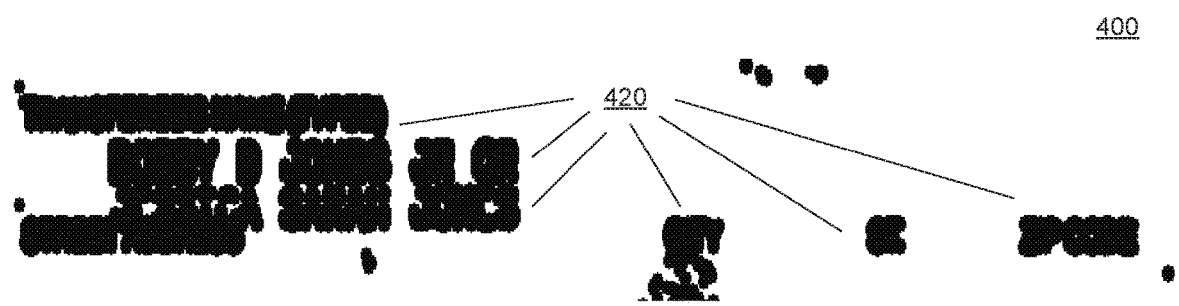

As shown in FIG. 4C, filters, such as dilation and erosion digital image filters, are applied to clip 400 and configured to smudge the text (as illustrated in FIG. 4B where the lines have been removed and only the text remains) into one or more large blobs of pixels 420. For example, a black blob 420 may indicate where the text originally was located.

Figure 4D:
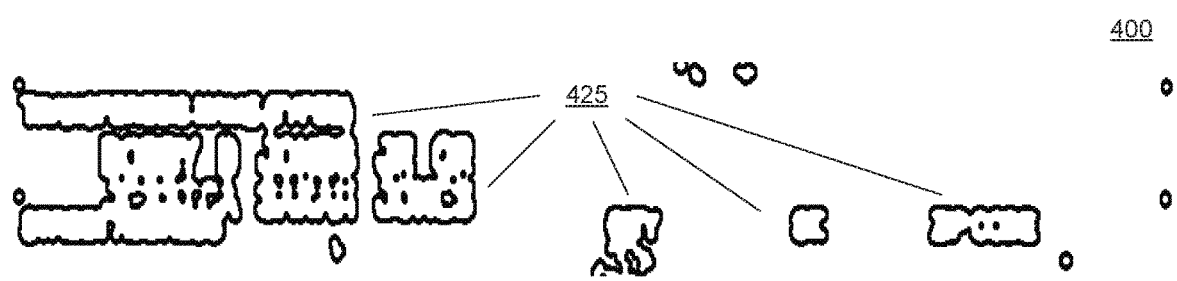

As shown in FIG. 4D, contouring is performed on the blob of pixels 420 so as to identify complete areas of text. This may be used to help locate text for data spillage that is desired for retaining. The resulting contours 425 around the smudged text may be used to encapsulate the pixels composing the text.

As shown in FIG. 4E, the original contour is represented by the bolder black lines. The thin black outline 430 around the text "TRANSFEREE'S NAME (TYPED) JONES SARAH" represents one of the resulting contours from text smudging overlayed on clip 400. As observed in FIG. 4E, other contours 435, 440 that may qualify for data spillage include "BOBBY D JESSICA" and "JR OR JONES." For example, once the text has been smudged together into blobs of pixels 420 (as illustrated in FIG. 4C), canny edge detection may result in an outline that represents location of the smudged text.

As shown in FIG. 4F, a pixel mask is created in relation to the original contour with the smudged contours previously depicted in FIG. 4E. Accordingly, clip 400 illustrates that the pixel mask results in removal of one or more white pixels. Application of the pixel mask allows determination of which data belongs with the new contour and which does not. In one example, "CITY" "ST." and "ZIP CODE" 445 are white pixels that are removed, and all black pixels that match will stay black.

As shown in FIG. 4G, clip 400 illustrates the resulting contour, post pixel masking applied in FIG. 4F, encapsulating data spillage. Artifact, such as line artifact 450, that appears through "JESSICA SARAH JONES" may be removed by ligature processing. For example, in FIG. 4G, line 450 may be removed after ligature processing and illustrates the contents of the resized contour after data spillage and masking have been applied.

As shown in FIG. 4H, clip 400 illustrates a comparison 455 of the original contour without application of the processes described herein.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A data recovery system comprising:
   a memory; and
   a processor coupled to the memory, the processor configured to:
   generate one or more pixel blobs based on application of a plurality of filters to smudge data from an image;
   adjust a first contour of the image to enclose spillage of the one or more pixel blobs;
   overlay the smudge data from the image within the adjusted first contour; and
   perform one or more conditional checks of the adjusted first contour.

2. The data recovery system of claim 1, wherein the processor is configured to subject the image through a plurality of passes to generate the first contour.

3. The data recovery system of claim 2, wherein a first pass from the plurality of passes identifies one or more shapes in the image.

4. The data recovery system of claim 3, wherein the processor is configured to create one or more bounding boxes to identify the one or more shapes.

5. The data recovery system of claim 1, wherein the processor is configured to create a mask to remove one or more pixels from the adjusted first contour.

6. The data recovery system of claim 1, wherein the processor is configured to remove one or more artifacts via ligature processing.

7. The data recovery system of claim 1, wherein the processor is configured to determine linearity of the image.

8. The data recovery system of claim 7, wherein the processor is configured to rotate the image so as to align one or more edges of the image with a predefined boundary.

9. The data recovery system of claim 1, wherein at least one filter from the plurality of filters brightens one or more regions of the image.

10. The data recovery system of claim 1, wherein the processor is configured to identify one or more pixel blobs that straddle one or more segments of the first contour.

11. A method of recovering data spillage comprising:
    generating, by a processor, one or more pixel blobs based on applying a plurality of filters to smudge data from an image;
    adjusting, by the processor, a first contour from the image to enclose spillage of the one or more pixel blobs;
    overlaying, by the processor, the smudge data from the image within the adjusted first contour; and
    performing, by the processor, one or more conditional checks of the adjusted first contour.

12. The method of recovering data spillage of claim 11, further comprising subjecting, by the processor, the image through a plurality of passes to generate the first contour.

13. The method of recovering data spillage of claim 12, wherein a first pass from the plurality of passes identifies one or more shapes in the image.

14. The method of recovering data spillage of claim 13, further comprising creating, by the processor, one or more bounding boxes to identify the one or more shapes.

15. The method of recovering data spillage of claim 11, further comprising creating, by the processor, a mask to remove one or more pixels from the adjusted first contour.

16. The method of recovering data spillage of claim 11, further comprising removing, by the processor, one or more artifacts via ligature processing.

17. The method of recovering data spillage of claim 11, further comprising:
    determining, by the processor, linearity of the image; and
    rotating, by the processor, the image so as to align one or more images of the image with a predefined boundary.

18. The method of recovering data spillage of claim 11, wherein at least one filter from the plurality of filters brightens one or more regions of the image.

19. The method of recovering data spillage of claim 11, further comprising identifying, by the processor, one or more pixel blobs that straddle one or more segments of the first contour.

20. A non-transitory computer-accessible medium having stored thereon computer-executable instructions, wherein upon execution by a processor, the instructions cause the processor to perform procedures comprising:
    generating one or more pixel blobs based on applying a plurality of filters to smudge data from an image;
    adjusting a first contour from the image to enclose spillage of the one or more pixel blobs;
    overlaying the smudge data from the image within the adjusted first contour; and
    performing one or more conditional checks of the adjusted first contour.

* * * * *